(12) United States Patent
Elias

(10) Patent No.: US 10,750,896 B2
(45) Date of Patent: Aug. 25, 2020

(54) IMMERSION BEVERAGE MAKER WITH PLUNGER ASSEMBLY

(71) Applicant: Caffeine Innovations, LLC, Madison, WI (US)

(72) Inventor: Tyler Elias, Madison, WI (US)

(73) Assignee: CAFFEINE INNOVATIONS, LLC, Madison, WI (US)

( * ) Notice: Subject to any disclaimer, the term of this patent is extended or adjusted under 35 U.S.C. 154(b) by 115 days.

(21) Appl. No.: 15/993,055

(22) Filed: May 30, 2018

(65) Prior Publication Data

US 2019/0365137 A1      Dec. 5, 2019

(51) Int. Cl.
| | |
|---|---|
| A47J 31/20 | (2006.01) |
| A47J 31/46 | (2006.01) |
| A47J 31/42 | (2006.01) |
| A47J 31/41 | (2006.01) |

(52) U.S. Cl.
CPC ............. *A47J 31/20* (2013.01); *A47J 31/41* (2013.01); *A47J 31/42* (2013.01); *A47J 31/46* (2013.01)

(58) Field of Classification Search
CPC .. A47J 31/20; A47J 31/41; A47J 31/42; A47J 31/46
See application file for complete search history.

(56) References Cited

U.S. PATENT DOCUMENTS

| | | |
|---|---|---|
| 2,459,498 A | 1/1949 | Cameron |
| 2,662,965 A | 9/1950 | Becker |
| 2,529,395 A | 11/1950 | Hummel |
| 2,568,840 A | 9/1951 | Zees |
| 3,451,329 A | 6/1969 | Herrera |
| 3,691,933 A | 9/1972 | Martin |
| 5,404,794 A | 4/1995 | Patel et al. |
| 5,544,566 A | 8/1996 | Bersten |
| 5,635,233 A | 6/1997 | Levinson |

(Continued)

FOREIGN PATENT DOCUMENTS

| | | |
|---|---|---|
| EP | 0380450 A2 | 8/1990 |
| FR | 2785515 A1 | 5/2000 |

(Continued)

OTHER PUBLICATIONS

English Translation for WO0027261 published Mar. 2000.*

*Primary Examiner* — Anthony J Weier
(74) *Attorney, Agent, or Firm* — Cozen O'Connor

(57) ABSTRACT

A beverage maker having a brew container with a base, a first cylindrical section having a first diameter attached to the base and a second section attached to the first cylindrical section having at least a portion with a second diameter that is greater than the first diameter; a liquid reservoir; a liquid delivery system configured to draw liquid from the liquid reservoir and deliver the liquid to the brew container; a plunger assembly having a filter portion configured to filter the substance to produce the beverage from the liquid and a gasket configured to form a seal between the plunger assembly and an inner wall of the brew container in the first cylindrical section As the plunger assembly is raised through the liquid from the base of the brew container a vacuum is formed between the plunger assembly and the bottom of the brew container and the filter traps and separates the substance to produce the beverage from the beverage.

13 Claims, 10 Drawing Sheets

(56) References Cited

U.S. PATENT DOCUMENTS

| | | | |
|---|---|---|---|
| 5,657,683 A | 8/1997 | Sandei et al. | |
| 5,875,703 A | 3/1999 | Rolfes | |
| 6,095,031 A | 8/2000 | Warne | |
| 6,227,101 B1 | 5/2001 | Rabadi et al. | |
| 6,240,833 B1 | 6/2001 | Sham et al. | |
| 6,339,985 B1 | 1/2002 | Whitney | |
| 6,877,891 B2 | 4/2005 | Hu | |
| 6,964,223 B2 * | 11/2005 | O'Loughlin | A47J 31/02 426/433 |
| 7,040,218 B1 | 5/2006 | Biolchinin, Jr. | |
| 7,285,300 B1 | 10/2007 | Allington et al. | |
| 7,455,867 B1 | 11/2008 | Gutwein et al. | |
| 7,578,231 B2 | 8/2009 | Liu | |
| 7,673,555 B2 | 3/2010 | Nosler et al. | |
| 7,861,644 B2 | 1/2011 | Ghassemlou et al. | |
| 7,946,752 B2 | 5/2011 | Swartz et al. | |
| 8,003,145 B2 | 8/2011 | Gutwein et al. | |
| 8,062,684 B2 | 11/2011 | Gutwein et al. | |
| 8,152,361 B2 | 4/2012 | Swartz et al. | |
| 8,286,547 B1 | 10/2012 | Lassota | |
| 8,371,211 B2 | 2/2013 | Nosler et al. | |
| 8,387,516 B1 | 3/2013 | Reynolds | |
| 8,529,119 B2 | 9/2013 | Swartz et al. | |
| 8,586,117 B2 | 11/2013 | Vastardis et al. | |
| 8,621,982 B2 | 1/2014 | Nosler et al. | |
| 8,739,689 B2 | 6/2014 | Bombeck et al. | |
| 8,770,097 B2 | 7/2014 | McLean et al. | |
| 8,789,458 B2 | 7/2014 | Kuempel | |
| 8,998,176 B2 | 4/2015 | Bishop et al. | |
| 9,154,547 B2 | 10/2015 | Kuempel et al. | |
| 9,480,279 B2 | 11/2016 | Fogelin et al. | |
| 2005/0105395 A1 | 5/2005 | Harrison | |
| 2005/0126401 A1 | 6/2005 | Streeter et al. | |
| 2005/0166765 A1 | 8/2005 | Lyall, III | |
| 2007/0181004 A1 | 8/2007 | Hale | |
| 2007/0186780 A1 | 8/2007 | Clark | |
| 2008/0282897 A1 | 11/2008 | Webster et al. | |
| 2010/0275785 A1 | 11/2010 | Weissman et al. | |
| 2011/0200726 A1 | 8/2011 | Tinkler et al. | |
| 2012/0090474 A1 | 4/2012 | Carbonini et al. | |
| 2012/0156344 A1 | 6/2012 | Studor et al. | |
| 2013/0032036 A1 | 2/2013 | Zhong et al. | |
| 2013/0156904 A1 | 6/2013 | Nosier et al. | |
| 2013/0330453 A1 | 12/2013 | Doglioni Majer | |
| 2014/0079854 A1 | 3/2014 | Vastardis et al. | |
| 2014/0242224 A1 | 8/2014 | Glucksman et al. | |
| 2016/0166103 A1 * | 6/2016 | Morse | A47J 31/20 99/297 |
| 2017/0295987 A1 * | 10/2017 | Habram | A47J 31/20 |
| 2017/0325617 A1 * | 11/2017 | Dujmich | A47J 31/20 |
| 2017/0360240 A1 * | 12/2017 | Morse | A47J 31/20 |
| 2019/0069711 A1 * | 3/2019 | Spitzley | A47J 31/38 |

FOREIGN PATENT DOCUMENTS

| | | |
|---|---|---|
| WO | 0027261 A1 | 5/2000 |
| WO | 2007030533 A1 | 3/2007 |
| WO | 2016025886 A1 | 2/2016 |

* cited by examiner

Brew Steps/Parameter Details

| # | Step | User Spec | Tech Spec |
|---|---|---|---|
| 1 | Coffee Amount | Specify coffee amount (g/tbsp) | - Convert units to grinder time (s)<br>- Report bean hopper is low<br>   - Photodiode or lever<br>- Open/close Hopper<br>   - Solenoid/Spring<br>- Grind Coffee<br>   - Motor |
| 2 | Coffee Grind | Specify coffee grind coarseness (medium, coarse, extra coarse) | - Convert setting to blade position (0, 1, 2)<br>- Position blades<br>   - Step motor |
| 3 | Water Amount | Specify water amount (g/cups), bounded by machine capacity (17oz) | - Convert units to pump time (s)<br>- Report water tank is low<br>   - Float<br>- Pump water<br>   - Pump |
| 4 | Water Temp | Specify temperature (approx. 180-210 F/82 - 99 C, depending on operating range of thermocouple) | - Convert to C<br>- Heat water<br>   - Heating element<br>   - Redundant array of thermocouples |
| 5 | Bloom Time | Specify bloom time (0:00 - 5:00) If zero this step is skipped | - Convert to (s) |
| 6 | Bloom water amount | N/A | - Calculated based on Coffee Amount, pump time (s)<br>- Subtract from overall water amount |
| 7 | Bloom agitation | Specify degree of agitation (None, low, medium, high, continuous) | - Convert to how often the agitator will spin for 2 seconds<br>   - 0 - Never<br>   - 1 - every 30 seconds<br>   - 2 - every 15 seconds<br>   - 3 - every 5 seconds<br>   - 4 - continuous<br>- Drive agitator<br>   - Geared drive motor |
| 8 | Brew Time | Specify time for main brew cycle (0:00 - 20:00) | - Convert to (s)<br>- Lower/Lift screen<br>   - Drive motor |

Fig. 14

| 9 | Brew Agitation | Specify degree of agitation for main brew (None, low, medium, high, continuous) | See bloom |
| --- | --- | --- | --- |
| 10 | Drain Coffee | N/A | - Ensure a receptacle is present<br>   - Pressure pad<br>- Open aperture<br>   - Solenoid/spring |

Interface Specifications

Recipe
1. Type = 0
2. Recipe ID (R###)
3. Recipe Name
4. Coffee Amount (s)
5. Coffee Grind (0, 1, 2)
6. Water Amount (s)
7. Water Temp (C)
8. Bloom Time (s)
9. Bloom Agitation (0, 1, 2, 3, 4)
10. Brew Time (s)
11. Brew Agitation (0, 1, 2, 3, 4)

Schedule
1. Type = 1
2. Schedule ID (S###)
3. Schedule Name
4. Ready Time (military time, 00:00 - 23:59)
5. Days of the week (Sunday [0] - Saturday[6],^-delim)
6. Recipe ID (R###)
7. Recipe Name

Fig. 14 Continued

IMMERSION BEVERAGE MAKER WITH PLUNGER ASSEMBLY

BACKGROUND OF THE INVENTION

1. Field of the Invention

The present invention relates to an apparatus and a method for brewing a beverage. More particularly, the present invention relates to an apparatus and a method for automatically brewing French press style coffee.

2. Description of the Related Art

One form of beverage production is referred to as "brewing". Brewing involves the dispensing of water into a brewing substance, such as coffee, tea, herbs, botanicals, as well as other substances. In the brewing process, the water extracts flavors from the brewing substance. The brewing substance and water is contained within a filter structure to allow beverage to drain from the infused brewing substance and water mixture. The brewing process often uses heated water but may use other liquids and may use the water or other liquids provided temperatures over a wide range. In other words, while brewing often uses heated water, there are also brewing techniques that use unheated or chilled water.

A variety of brewing apparatus and systems have been developed. Drip brewing systems allow the beverage to drain through a filter under force of gravity. An example of a drip brewing system involves a brewing substance holder, often referred to as a funnel which contains the brewing substance and receives water for mixing with the brewing substance. The funnel is lined with a filter material, either disposable or reusable. The brewing substance is placed in the filter of the funnel and water is dispensed over the brewing substance. Beverage drains from the filter through an opening in the funnel for dispensing into a cup or larger container such as a carafe.

Another form of brewing system involves a technique referred to as "French press". In a French press system, coffee is placed in a container and heated water is pour over the coffee. Generally, the coffee and water are maintained in direct contact for the duration of the brewing process. The heated water is mixed with the brewing substance to produce a beverage. A plunger, which includes a filter, is placed in the container and pressed downwardly through the water and brewing substance mixture. Beverage passes through the filter and remains on top of the filter with the remaining spent brewing substance being trapped between the plunger filter and the bottom of the container. The brewed beverage can then be dispensed from the container.

The French press, sometimes referred to as a press pot, is a popular immersion-type coffee brewing apparatus, which is known for producing richly flavored coffee through extended contact between the brewing liquid and the ground coffee. A French press makes coffee by steeping the grounds in hot water, and then pressing the grounds out. After a drip coffee maker, French press is one of the easiest ways to make a great cup of coffee. Also, unlike a pour-over, it makes it easy to brew coffee for several people at once. However, it is prone to bitterness and oiliness because the coffee is sitting directly on the grounds for a period of time.

A common method for making this type of coffee uses a cylindrical brewing container paired with a screen on a plunger that is manually operated to press the grounds to the bottom of the brewing container, which separates the grounds from the brew liquid. After separation, the user can pour the coffee out of the container while the coffee grounds remain trapped by the plunger. Specifically, the coffee is first ground to a course-grind and placed in the brewing container. Next, hot water is added, saturating the grounds to insure that there are no dry spots. The grounds and water are then stirred and left to steep. Typically, the brewing container cover, which includes a screened plunger, is attached to the brewing container. Finally, after a steep time, the plunger is pressed down allowing the brewed coffee to pass through the screen while pressing the grounds to the bottom of the brewing container. The brewed coffee is immediately poured into cups or a carafe to avoid over extraction because if the coffee sits on the grounds too long, it continues to extract and will become bitter.

Referring to FIG. 15, ground coffee 10 and hot water 12 are placed in a coffee container 14 to brew. Because the ground coffee 10 often floats to the surface of the water 12, one may stir or otherwise agitate the mixture of the ground coffee 10 and the water 12 to more thoroughly wet the individual coffee grounds that constitute the ground coffee.

Referring to FIG. 16, after the coffee 15 has brewed, one grasps a handle 16 of a filter 18, inserts the filter into the coffee container 14, and presses the filter down toward the bottom of the pot. For the taste of the brewed coffee to be relatively uniform from container to container, one typically uses a timer to measure the brew time.

Because the filter 18 passes liquid but does not pass coffee-ground-sized particles, as the filter is pressed towards the bottom of the coffee container 14, the substantially ground-free brewed coffee 15 fills the portion of the container above the filter while the filter retains the ground coffee 10 in the portion of the container below the filter.

After the filter 18 is pressed to the bottom of the container, a spout 24 of the coffee container 14, is used to pour the substantially ground-free brewed coffee 15 into a cup. After the brewed coffee 15 is poured from the container 14, the filter 18 is retracted from the container 14 by pulling on the handle 16, the ground coffee 10 is removed from the container, and the filter and the container are cleaned.

SUMMARY OF THE INVENTION

A manual process for brewing French press style coffee is straight-forward, making a consistent cup of French press coffee is difficult as it requires time and attention to various details and is therefore prone to inconsistency. Some apparatuses have automated the process, but use delicate and expensive components, such as compressed air or close tolerance pistons and very fine screens.

One aspect of the present invention seeks to address these deficiencies by automating the process of brewing French press style coffee with simple yet effective components.

In contrast to the traditional French press, the present screen is specifically designed such that the coffee is brewed or steeped above the screen, rather than below the screen as in traditional French presses, by creating a basket to contain the grounds when the filter screen is raised. Because the steeping occurs above the screen, the traditional 3-layer design of the French press filter is reversed. By steeping above the filter, after brewing the filter is raised to filter the grounds from the brewed coffee. While lifting the filter, which has a gasket seal between the filter and the brew container, a vacuum is formed between the filter and the brew container bottom. Preferably, the gasket is a dual-ribbed gasket. The disclosed apparatus uses vacuum rather than mechanical pressure to extract remaining oils and liquid from the coffee grounds. Using a vacuum simplifies clean-up because a drier, compacted coffee ground bed on top of the filter is easier to deal with compared to a compressed puck at the bottom of the brew container. Another advantage of lifting the filter is being able to fully separate the ground coffee from the liquid while the liquid remains in the brew container, which allows for delayed removal of the coffee from the brewing chamber prior to serving while preventing the over-extraction that leads to bitterness.

According to one aspect of the present invention, the brew container has a widened mouth that breaks the vacuum seal between the filter and the brew container.

According to one aspect of the present invention, the brewed coffee is drained from the bottom of the brew container, which allows gravity to do the work, rather than pumping or pouring.

According to one aspect of the present invention, an agitating plunger rod is configured for use with the above-screen configuration. Agitation blades of the agitating plunger rod are arranged above the screen so that they are immersed in the ground coffee and water as the ground coffee steeps, which helps mix the coffee as it brews and introduces fresh water more quickly. Preferably, sealed ball bearings allow for free rotation of an outer shell, which is attached to the blades. An upper portion of the outer shell of the agitator allows for engagement with a drive gear for agitation. Preferably, the upper portion of the outer shell is splined.

According to one aspect of the present invention, a keyed upper portion of the inner rod is provided for lifting and for secure attachment to the machine. The keyed upper portion is shaped for easily handling while affixing the rod into the screen assembly.

A fully automated immersion coffee steeper is configured to begin brewing at a user-specified time and follow user-specified program. In one embodiment, programs are stored in a volatile or nonvolatile memory, locally or in an accessible database, and run on a microprocessor. Available program parameters include initiation time, grind coarseness, coffee amount, water amount, water temperature, preconditioning time, preconditioning agitation frequency, main steep time, and main steep agitation frequency.

The user prepares the automated immersion coffee steeper by attaching a plunger to keyed posts on a lift apparatus and installing the brew container to the supports below the plunger. Preferably, a bean hopper is filled with whole coffee beans and a water reservoir is filled with fresh water. The machine begins by moving the straining plunger to a bottom of the brewing container. The apparatus will measure and grind whole-bean coffee from the hopper into the brew container and more specifically into the cupped cavity of the plunger screen assembly. An initial quantity, typically a small amount, of hot water at a pre-specified temperature is added into the brewing container to precondition ("bloom") the coffee. The duration and agitation level can also be specified for this preconditioning portion of the cycle. Agitation is achieved by motor-driven rotation of the plunger rod. Preferably, the agitator portion of the plunger rod moves independent of a static inner portion of the rod due to sealed ball bearings. The outer shell of the rod has agitation blades attached, while the inner portion of the rod is threaded on the bottom to join with the screen assembly. After the precondition period has ended, the remaining hot brew water is added to the container for a specified brew time, which can be agitated according to user preferences to suit the coffee being brewed. After the brew time is reached, the machine lifts the plunger to separate the coffee grounds from the freshly brewed liquid coffee.

Due to a rubber gasket forming a seal around the plunger and resistance from the ground coffee bed, a vacuum is created below the plunger screen as it rises, forcing the brew liquid followed by air through the ground coffee bed. This vacuum pressure replicates the mechanical press action of a traditional French press coffee apparatus, while also drying the ground coffee as air is forced through the coffee, making clean-up easier.

The top of the brewing container widens in order to break the seal after a sufficient lift distance to dry the coffee. This allows air to flow freely past the screen as the brewed coffee is allowed to drain out the bottom of the brew container, through an electronically controlled aperture, into a receiving container of the user's choice. A secondary metal screen or paper filter can be added at the bottom of the container, below the plunger and above the aperture, depending on the user's preference. This allows for additional configurability by removing fine particles and/or oils from the brewed coffee, ultimately changing its character. According to one aspect of the invention, the coffee is poured out of the brew container in a manner similar to a traditional French press. The machine can then be cleaned by removing brew container and the plunger, discarding the used coffee grounds, then rinsing the aforementioned pieces.

In addition to pre-loaded programs, combinations of these parameters will be able to be named and saved by the user as complete programs to allow for consistency. These programs can be stored locally or in a database accessible to the apparatus.

Alternative embodiments of the beverage-brewing machine are contemplated. For example, the machine may include one or more of the disclosed components, one or more of the described components may be omitted, the function of multiple components may be consolidated into fewer units, or the function of a single unit may be divided among multiple units. Further, the beverage-brewing may be a manual machine such that an operator provides the ground coffee and/or the water.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 14 programming menu for the French press style coffee maker; and

DETAILED DESCRIPTION OF THE PRESENTLY PREFERRED EMBODIMENTS

Figure 1:
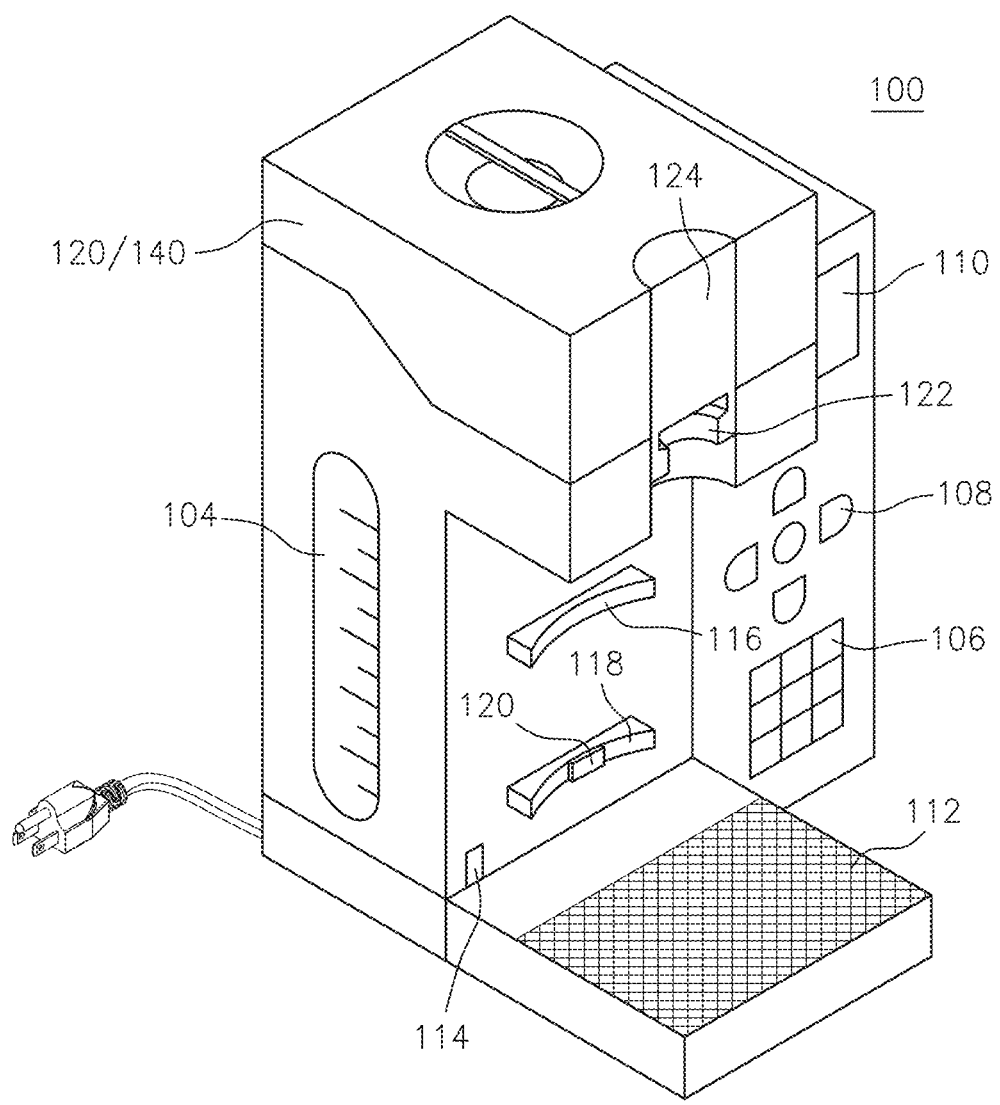
FIG. 1 is a French press style coffee maker.

FIG. 1 is a French press style coffee maker 100. The French press style coffee maker 100 includes a bean hopper 102 and a water reservoir 104. In one embodiment, the bean hopper 102 has an integrated bean grinder 140. In one embodiment, the water reservoir 104 has a scale showing the volume of water in the water reservoir 104. Preferably, the water reservoir 104 also includes a particulate and/or chemical filter. The French press style coffee maker 100 includes control panels 106, 108, which comprise touch sensitive controls, buttons, or the like. A display 110 is provided that displays current conditions, programming steps, instructions, help menus, and the like. A platform 112 is provided. The platform 112 can be raised or lowered in track 114. The platform 112 can include a drain for drips and spills. A pair of mounts 116, 118 are provided. In one embodiment, the mounts 116, 118 are configured to hold a brew container 300. For example, brew container 300 has grooves to receive the mounts 116, 118. At least one of the mounts 116, 118 includes a connector 120. The connector 120 is used to control the brew container 300.

Figure 2:
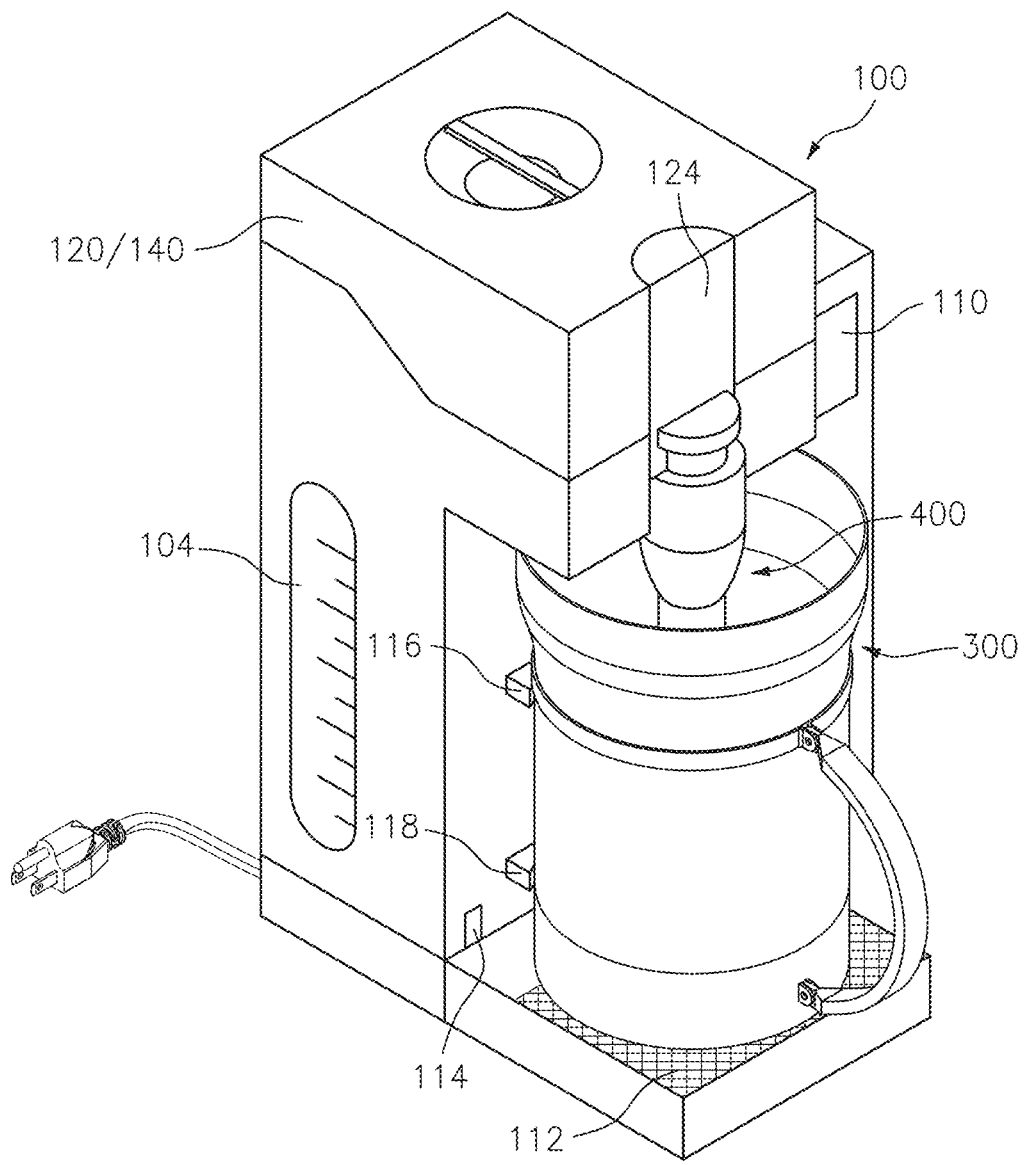
FIG. 2 is a French press style coffee maker with a brew container.

FIG. 2 is the French press style coffee maker 100 with a brew container 300 in its use position. The French press style coffee maker 100 has the rod assembly 400 in the ready position. A mug can be placed beneath the brew container 300. In one embodiment of the invention, the brew container 300 is used as a mug. When no mug is used, the platform 112 is raised to contact and support the bottom of brew container 300. The mounts 116, 118 are arranged in grooves in the brew container 300 to secure the brew container. Alternatively, other mounting mechanisms can be used.

Figure 3:
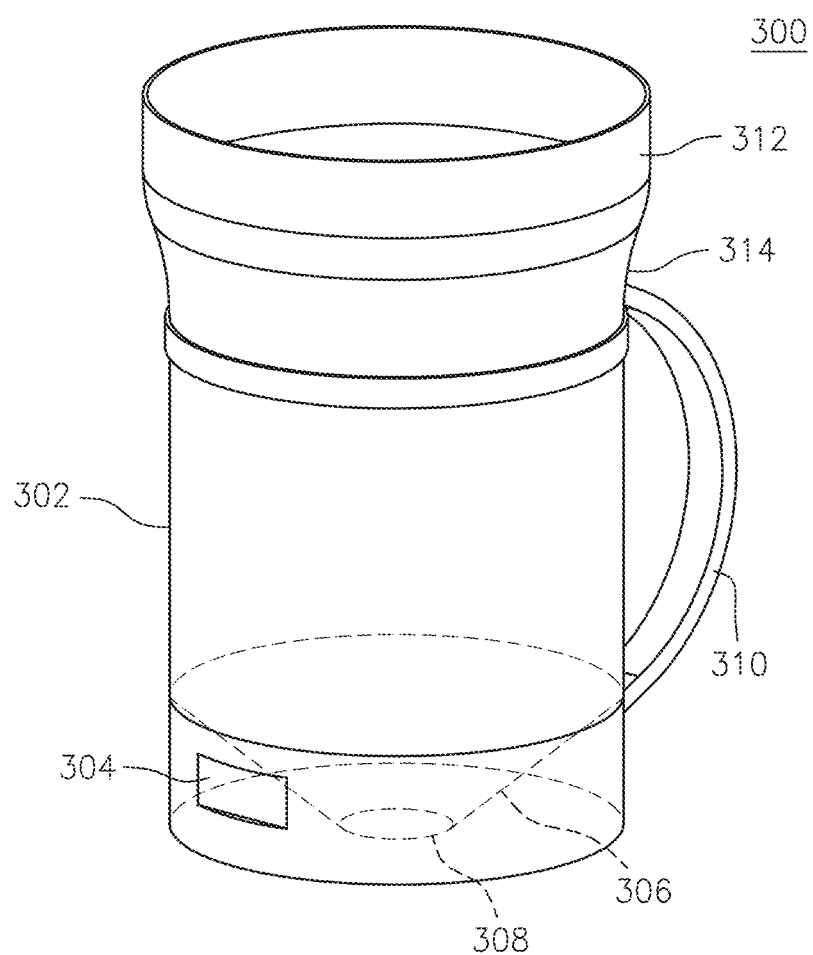
FIG. 3 is a brew container.

FIG. 3 is the brew container 300. The brew container 300 is defined by a first cylindrical portion 302 and a widened mouth portion 312. In one embodiment, the widened mouth portion 312 is only larger in a portion of the circumference of the brew container. The widened mouth portion 312 can be circular, oval, keyhole shaped, or the like. A transition section 314 is provided between the first cylindrical portion 302 and the widened mouth portion 312. The transition section 314 is provided to dry the coffee grounds after a brew cycle. A bottom portion of the brew container 300 is shaped to accept a brewing basket that holds and filters the ground coffee. Preferably bottom portion is a conic or semicircular section 306. In one embodiment, the brew container 300 includes a valve 308 that is controlled by signals provided by contact 304. The valve can also comprise an additional filter. After brewing, an instruction is provided that opens the valve 308 allowing the brewed coffee to be dispensed into a mug 20. In one embodiment, the brew container 300 is a thermal container. Alternatively, the brew container 300 can be used as a mug or a carafe.

Figure 4A:
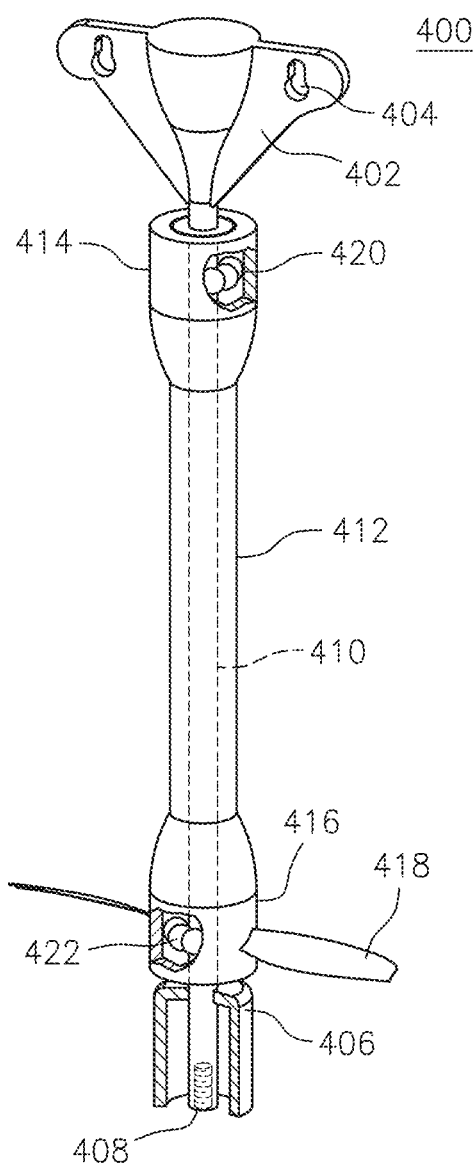
FIGS. 4A and 4B are agitator assemblies.
Figure 4B:
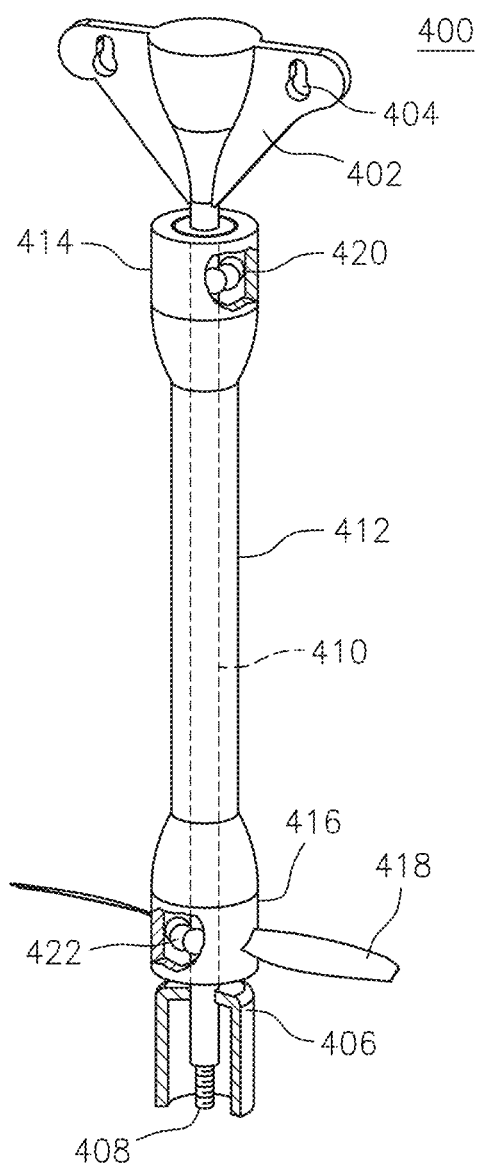
Figures 11, 12:
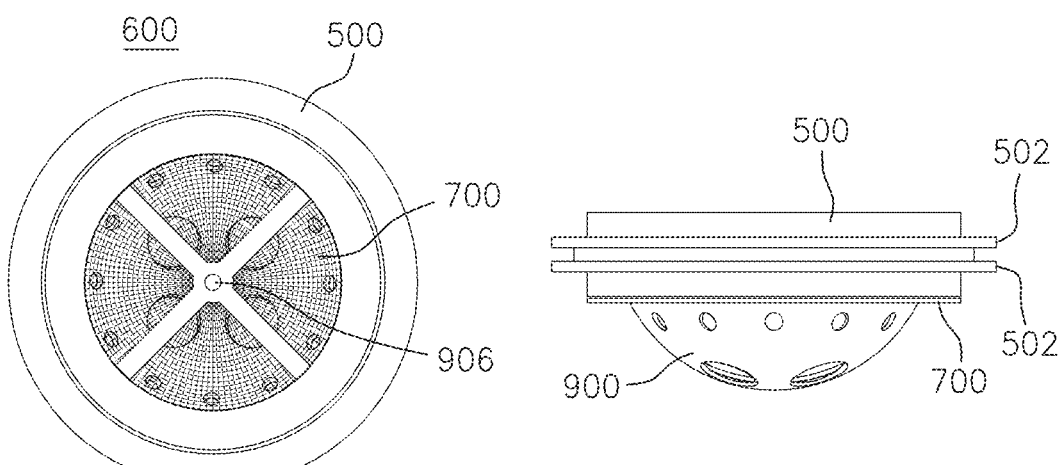
FIG. 11 is a top view of a plunger assembly.
FIG. 12 is a side view of the plunger assembly.

FIGS. 4A and 4B are rod assemblies 400. A first end portion 402 of the rod assembly 400 is configured to be mounted to a lift apparatus by keyed slots 404. Alternatively, the first end portion of the rod assembly 400 is a threaded rod for a worm gear assembly, linear gear assembly, linear actuator, lead screws, slide screws, or the like, which is used to raise and lower the rod assembly during use. A second end portion 408 of the rod assembly 400 is configured to mate with a plunger assembly 600 (FIGS. 11 and 12). The second end portion 408 can be internally threaded or externally threaded depending on the connection configuration of the plunger assembly. A shield 406 surrounds the second end portion to prevent coffee grounds from interfering with the rod assembly to plunger assembly connection. A rod 410 connects the first end portion 402 of the agitator assembly to the second end portion 408. An agitator sleeve 412 surrounds the rod 410. The agitator sleeve 412 is coaxially arranged with respect to the rod 410 and rotates freely about the rod 410. A first end 414 of the agitator sleeve 412 is configured to be driven by a motor (spin agitator 160) to rotate agitator sleeve 412 during the brewing process. A second end 416 of the agitator sleeve 412 includes agitator blades 418. While two agitator blades 418 are shown, additional blades can be provided spaced equidistantly about the circumference of the second end 416. Sealed bearings 420, 422 are provided at each end of agitator sleeve 412 to aid in the free rotation of the agitator sleeve.

Figure 5:
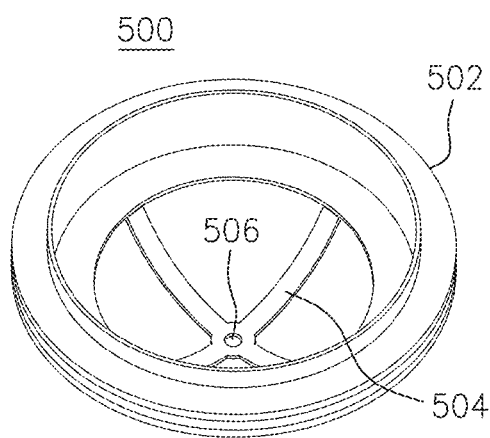
FIG. 5 is a perspective view of a basket frame.
Figure 6:
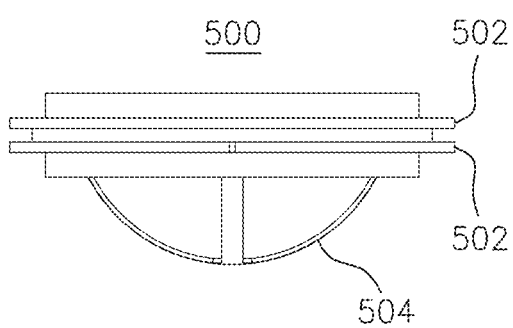
FIG. 6 is a side view of the basket frame.

FIG. 5 is a perspective view of a basket frame 500 and FIG. 6 is a side view of the basket frame 500. Basket frame 500 has at least one seal 502 that is configured to made with an inside wall of the brew container 300. Seal 502 is an O-ring seal rubber gasket, or the like. One or more supports 504 are provided that support a screen or filter 700. An aperture 506 is provided in the basket frame 500. As will be discussed below, a mounting stem will pass through the aperture 506 for connection to the second end portion 408 of the rod assembly 400.

Figure 7:
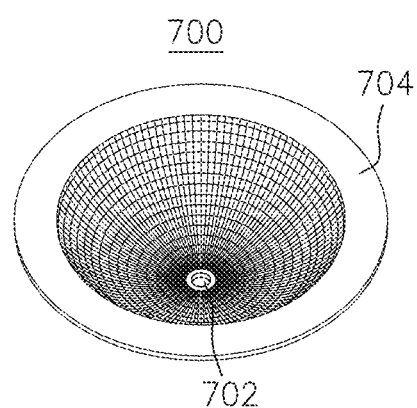
FIG. 7 is a perspective view of a filter.
Figure 8:
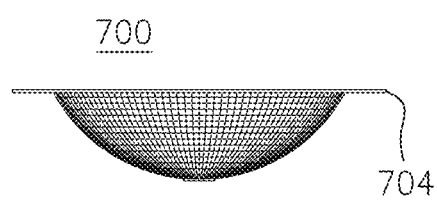
FIG. 8 is a side view of the filter.

FIG. 7 is a perspective view of a filter 700 and FIG. 8 is a side view of the filter 700. The filter 700 is a screen material and shaped to mate with the basket frame 500. The filter 700 has a lip 704. In one embodiment, the lip 704 is a solid ring to which the screen material of the filter 700 is attached. Alternatively, the lip 704 is also made from the screen material of the filter 700. The filter material can be welded to the lip 704 or connected by any other acceptable connection method. An aperture 702 is provided in the filter 700. As will be discussed below, a mounting stem will pass through the aperture 702 for connection to the second end portion 408 of the rod assembly 400.

Figure 10:
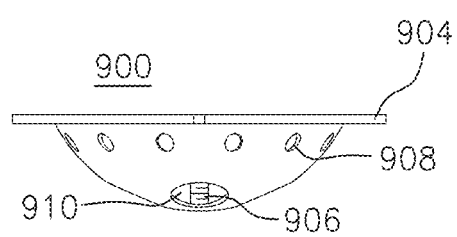
FIG. 10 is a side view of the basket.
Figure 9A:
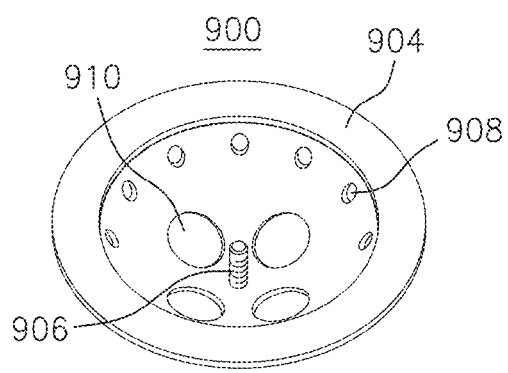
FIGS. 9A and 9B are perspective views of a basket.
Figure 9B:
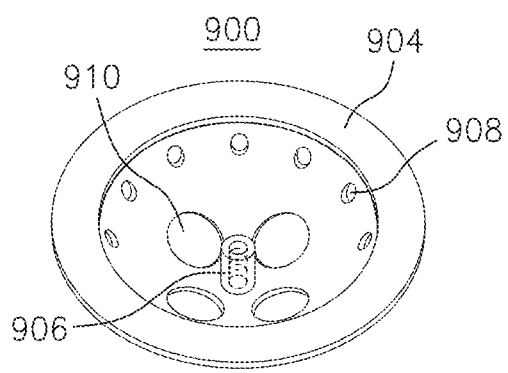

FIGS. 9A and 9B are perspective views of a basket 900 and FIG. 10 is a side view of the basket 900. The basket 900 supports the filter 700 against basket frame 500. A lip 904 compresses lip 704 of the filter against the basket frame 500. A mounting stem 906 passes through aperture 702 of the filter 700 and aperture 506 of the basket frame 500 and will be connected to the second end portion 408 of the rod assembly 400. The mounting stem 906 can have an external thread configured to mate with an internal thread of the second end portion 408. Alternatively, the mounting stem 906 can have an internal thread configured to mate with an external threat of the second end portion 408. Drainage holes 908 and 910 are distributed over an entire surface of the basket 900, which allow brewed coffee 15 to collect in the brew container 300 as the plunger assembly 600 is lifted.

FIG. 11 is a top view of a plunger assembly 600 and FIG. 12 is a side view of the plunger assembly 600. As shown, the plunger assembly is assembled such that the filter 700 is sandwiched between basket 900 and basket frame 500. The mounting stem 906 is shown traversing both apertures 506, 702 so that it is inside the basket frame 500. In one embodiment, the mounting stem 906 has an external thread that corresponds to a thread inside aperture 506 so that the basket 900 is screwed to the basket frame 500.

Figure 13:
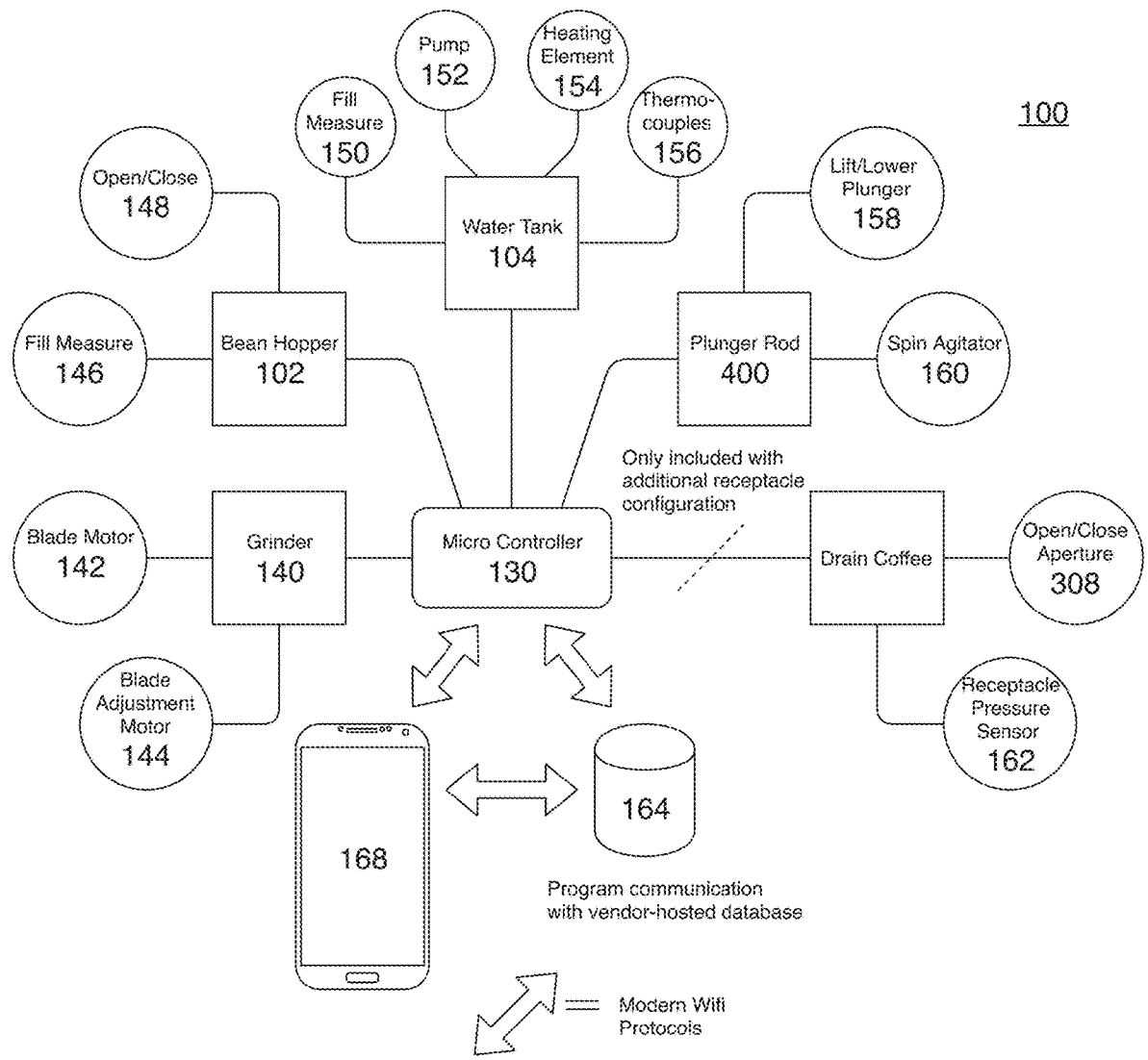
FIG. 13 is a functional block diagram of the French press style coffee maker.
Figure 15:
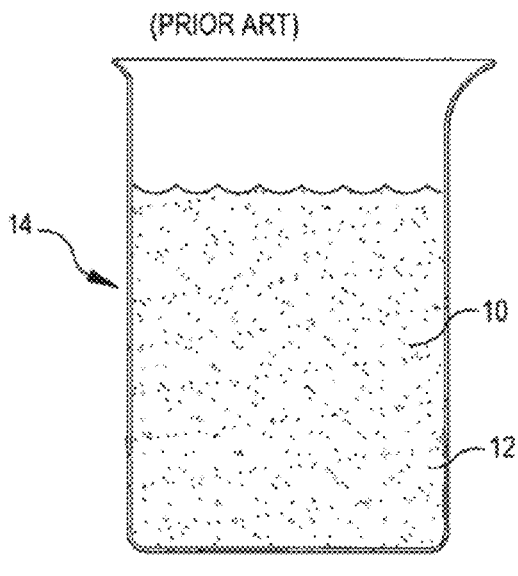
FIGS. 15-16 illustrate a conventional French press technique for brewing coffee.
Figure 16:
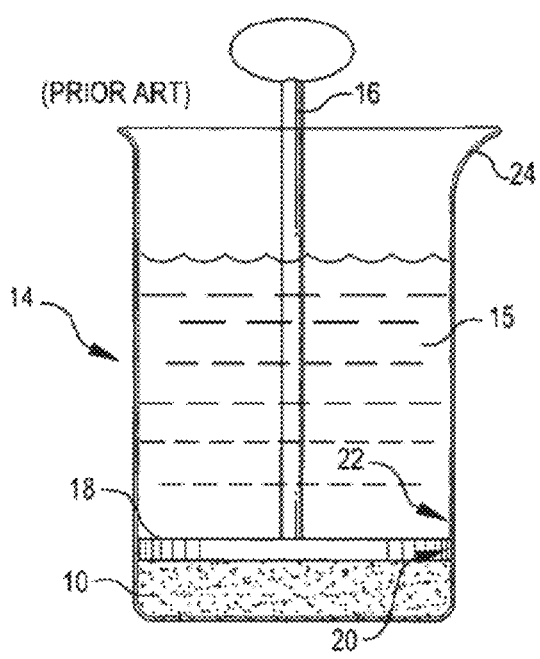

FIG. 13 is a functional block diagram of the French press style coffee maker 100. The French press style coffee maker 100 is controlled by a microcontroller 130 that can be programmed and controlled as discussed above or using a smart device 168. Smart device 168 can be a cell phone, tablet, smart home device, or the like. Microcontroller 130 controls a grinder 140, the bean hopper 102, the water reservoir 104, the rod assembly 400, and the brew container 300.

The grinder 140 receives beans from the bean hopper 102. The grinder 140 includes a blade motor 142 and optionally a blade adjustment motor 144. The blade adjustment motor moves the blades or the burrs, which represent the two different styles of grind mechanism, closer or farther apart. Closer blades or burrs results in a finer grind. This is the major factor that affects the coarseness of the ground coffee. According to one aspect of the invention, blade adjustment is the controlling factor to grind coarseness with the speed and duration as possible other factors. The grinder 140 can also be controlled to very a size of the ground coffee for optimum in accordance with a user's taste. The size of the ground coffee is varied by adjusting a speed and duration of the grind.

The bean hopper 102 is controlled by the microcontroller 130 so that a dispensing portion 148 is opened or closed. Opening and closing the bean hopper 102 fills the grinder 140 with a specified amount of coffee to be ground. To open the hopper, a solenoid is activated that opens a flap or door to dispense the beans. The bean hopper may include a sensor 146 that measures a volume and/or weight of the coffee beans being dispensed from the bean hopper 102. Alternatively, grinder run time can be used to determine a specific amount of coffee because a longer running provides more coffee in a linear relationship.

Water reservoir 104 includes a fill measure sensor 150 that detects how much water is in the water reservoir 104. An alert is provided when there is insufficient water to prepare a preset amount of brewed coffee. There is a pump 152 and heating element 154 that pumps water from the water reservoir 104 and heats it to a desired brewing temperature. The temperature of the water is monitored using one or more thermocouples 156. It should be noted that the water in water reservoir 104 is heated in a separate container so that not all of the water in the water reservoir 104 is heated every time coffee is brewed.

The rod assembly 400 is controlled by a lifting assembly 158 and a spin agitator 160. It should be noted that lifting the assembly and spinning the agitator can be performed by the same motor. In one embodiment, the lifting assembly 158 is a screw gear that raises and lowers the plunger rod and plunger assembly 600. The lifting assembly 158 is shown schematically in FIGS. 1 and 2 as lift assembly 124. Alternatively, a worm gear, hydraulics, a threaded rod for a worm gear assembly, linear gear assembly, linear actuator, lead screws, slide screws, or the like can be used to raise and lower the plunger assembly 600 and the rod assembly 400. The spin agitator 160 causes the agitator sleeve 412 and agitator blades 416 to rotate to agitate the coffee grounds in the brew container 300 while they are being brewed. Preferably the spin agitator is coupled to the first end 414 of the agitator rod and rotates the agitator as required and in accordance with a user's program.

The microcontroller 130 also controls the brew container 300. The aperture or valve 308 is controlled to allow the brewed coffee to drain from the brew container 300 once the brew cycle is complete. Optionally a pressure sensor 162 is included to monitor the pressure in the brew container 300 during the brewing process.

FIG. 14 is a programming menu for the French press style coffee maker 100. Initially, a user selects an amount of coffee. The amount of coffee is specified in grams, ounces, tablespoons, or the like. The microcontroller converts the specified amount into a grinder time. The bean hopper 102 will report when the bean quantity is low. The user can also specify the coffee grind. Specifically, the user specifies a coffee grind coarseness such as medium, coarse, extra coarse, or the like. The microcontroller converts the setting to blade position or burr position (0, 1, 2, etc.) and positions the blades or burrs and starts the motor to grind the beans to the desired coarseness.

The amount of water that is specified affects the amount of coffee brewed and the strength of the brewed coffee. The amount of water is bounded by the reservoir capacity. The specified volume is converted to a pump time and the required volume is pumped from the reservoir to be warmed and used in the brewing process. Preferably, an alert is issued when the water level in the reservoir is low. The water level is determined with a float, a sensor, or the like.

For brewing, the water temperature is specified between approximately 180° F.-210° F. (82° C.-99° C.). A heating element is used to heat the water and the temperature is verified with a redundant array of thermocouples.

The French press style coffee maker 100 allows a user to specify bloom time. Bloom times typically range from no bloom time to about 5:00 minutes. An amount of bloom water is calculated based on at least the coffee amount and pump time. The amount of bloom water is subtracted from the overall water amount. During the bloom, bloom agitation occurs. The user can specify a degree of agitation such as none, low, medium, high, or continuous. The levels correspond to a two (2) second rotation of the agitator. For example the agitator will spin for 2 seconds every 30 seconds, every 15 seconds, every 5 seconds, or continuously. The user can also specify the brew time and brew agitation. Alternatively, agitation can be specified by beginning, middle, and end of the brew cycle. For example, the user can specify more agitation early in the brew process and less agitation later in the brew process, or the like.

In use, for a fully automated French press style coffee maker 100, a user initially fills bean hopper 102 with coffee beans and fills the water reservoir 104 with water. The user assembles the rod assembly 400 and plunger assembly 600. The plunger assembly 600 is put into the brew container 300 and pressed to the bottom of the brew container. The brew container 300 is then attached to the coffee maker and the rod assembly 400 is then affixed to mating section 122. Once mated, the coffee maker ensures that the rod assembly 400 is at the bottom of the brew container.

Alternatively, the agitator assembly is inserted into the coffee maker at mating section 122 and moved to its upward position so that the brew container 300 can be inserted into the coffee maker. Once the brew container 300 is inserted in the coffee maker the rod assembly 400 presses the plunger assembly 600 to the bottom of the brew container 300.

With the plunger assembly at the bottom of the brew container a group program is entered using control panels 106, 108. In the fully automatic, beans are dispensed from the bean hopper 102, ground to a desired coarseness, and placed in the brew container 300. Alternatively, a user can place preground coffee in the brew container 300. Next, a predetermined amount of water is heated and poured into the brew container 300. At this point, if desired, the bloom is agitated. After the bloom time the remaining water is poured into the brew container 300. After the brewing time, the lifting mechanism is activated to lift the plunger assembly from the bottom of the brew container 300. Due to the seals 502 on the plunger assembly a vacuum is created between the bottom of the brew container and the plunger assembly. As the plunger assembly lifts, the coffee grounds are filtered from the brewed coffee and collected in the filter 700. When the plunger assembly is in the transition section 314 of the brew container is preferably no longer submerged in the brewed coffee. In this section, the coffee grounds in the filter 700 are dried due to additional air being forced through the grounds as the plunger assembly lifts. Finally, the plunger assembly enters the widened mouth portion 312 of the brew container 300. At this point, the vacuum is released and the valve 308 can be opened in the coffee poured into a mug or other cup. Alternatively, the brew container 300 can be used as a cup for drinking the brewed coffee.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A beverage maker configured to mix a liquid and a substance to produce and dispense a beverage, comprising:
   a brew container having a base, a first cylindrical section having a first diameter attached to the base and a second section attached to the first cylindrical section having at least a portion with a second diameter, the second diameter being larger than the first diameter;
   a liquid reservoir;
   a liquid delivery system configured to draw liquid from the liquid reservoir and deliver the liquid to the brew container;
   a plunger assembly comprising:
      a filter portion configured to filter the substance to produce the beverage from the liquid; and
      a gasket configured to form a seal between the plunger assembly and an inner wall of the brew container in the first cylindrical section;
   a rod assembly comprising:
      a coupler configured to couple to the plunger assembly at a first end of the rod assembly; and
      an agitator assembly configured to rotate about a longitudinal axis of the rod assembly having at least one stirring element;
   an agitator motor configured to rotate the agitator assembly; and
   a lifting mechanism configured to raise and lower the rod assembly from a position at which the plunger assembly is at the base of the brew container to at least the second section of the brew container,
   wherein as the plunger assembly is raised through the liquid and the substance to produce the beverage a vacuum is formed between the plunger assembly and the bottom of the brew container and the filter portion traps and separates the substance to produce the beverage from the liquid,
   wherein the brew container comprises a valve mechanism arranged in the bottom of the brew container to vertically dispense the beverage after the plunger assembly is raised to at least the second section of the brew container to release the vacuum formed between the plunger assembly and the bottom of the brew container.

2. The beverage maker according to claim 1, wherein the liquid delivery system is further configured to heat the liquid.

3. The beverage maker according to claim 1, further comprising a hopper affixed to the beverage maker and separate from the brew container and configured to retain the substance to produce the beverage.

4. The beverage maker according to claim 3, further comprising a grinder configured to grind the substance to produce the beverage and deposit the substance to produce the beverage into the brew container.

5. A beverage maker configured to mix a liquid and a substance to produce and dispense a beverage, comprising:
   a brew container having a base, a first cylindrical section having a first diameter attached to the base and a second section attached to the first cylindrical section having at least a portion with a second diameter, the second diameter being larger than the first diameter;
   a liquid reservoir;
   a liquid delivery system configured to draw liquid from the liquid reservoir and deliver the liquid to the brew container;
   a plunger assembly comprising:
      a filter portion configured to filter the substance to produce the beverage from the liquid; and
      a gasket configured to form a seal between the plunger assembly and an inner wall of the brew container in the first cylindrical section;
   a rod assembly comprising:
      a coupler configured to couple to the plunger assembly at a first end of the rod assembly; and
      an agitator assembly configured to rotate about a longitudinal axis of the rod assembly having at least one stirring element;
   an agitator motor configured to rotate the agitator assembly;
   a lifting mechanism configured to raise and lower the rod assembly from a position at which the plunger assembly is at the base of the brew container to at least the second section of the brew container,
   wherein as the plunger assembly is raised through the liquid and the substance to produce the beverage a vacuum is formed between the plunger assembly and the bottom of the brew container and the filter portion traps and separates the substance to produce the beverage from the liquid, and
   a microprocessor configured to:
   control the lifting mechanism:
      to insure that the plunger assembly is at the bottom of the brew container at a beginning of a brew cycle and raise the plunger assembly into to the second section of the brew container to release the vacuum at an end of the brew cycle;

controlling the liquid delivery system to deliver a predetermined quantity of liquid from the liquid reservoir and deliver the liquid to the brew container; and control an agitator motor to rotate the agitator assembly during the brew cycle.

6. The beverage maker according to claim 5, wherein the microprocessor is further configured to:

control a valve mechanism arranged in the bottom of the brew container to vertically dispense the beverage after the plunger assembly is raised to into at least the second section of the brew container to release the vacuum formed between the plunger assembly and the bottom of the brew container.

7. The beverage maker of claim 1, wherein the plunger assembly comprises:

a frame configured to retain the gasket and shaped to retain the filter portion; and a coupler configured to mate with the coupler of the rod assembly.

8. The beverage maker according to claim 1, wherein the second section is one of oval, round, and key shaped.

9. The beverage maker according to claim 5, wherein the liquid delivery system is further configured to heat the liquid.

10. The beverage maker according to claim 5, further comprising a hopper affixed to the beverage maker and separate from the brew container and configured to retain the substance to produce the beverage.

11. The beverage maker according to claim 10, further comprising a grinder configured to grind the substance to produce the beverage and deposit the substance to produce the beverage into the brew container.

12. The beverage maker of claim 5, wherein the plunger assembly comprises:

a frame configured to retain the gasket and shaped to retain the filter portion; and a coupler configured to mate with the coupler of the rod assembly.

13. The beverage maker according to claim 5, wherein the second section is one of oval, round, and key shaped.

* * * * *